UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

YELLOW AZO DYE AND PROCESS OF MAKING SAME.

SPECIFICATION forming part of Letters Patent No. 656,120, dated August 14, 1900.

Application filed May 29, 1900. Serial No. 18,430. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in Yellow Azo Coloring-Matters, of which the following is a specification.

My invention relates to the production of a new substantive azo coloring-matter which may be obtained by diazotizing a specified thiazol body, such as primulin or dehydrothiotoluidin sulfoacid and combining the diazo body with nitro-meta-phenylene-diamin-sulfoacid. As nitro-meta-phenylene-diamin-sulfoacid is a new body which has hitherto not been prepared, I describe the manner in which it can be prepared, but make no claim to it. It can be obtained by treating the meta-dichlor-benzene-sulfoacid obtained by Beilstein and Kurbatow (*Annalen der Chemie*, Vol. 182, p. 97) with a mixture of sulfuric and nitric acid free from water. A nitro-dichlor-benzene-sulfoacid is thus formed which when heated at a temperature of from 150° to 160° centigrade with aqueous ammonia is converted into the desired nitro-meta-phenylene-diamin-sulfoacid.

The following example explains how my invention may be carried into practical effect and my new coloring-matter obtained. The parts are by weight.

Dissolve sixty-six (66) parts of primulin in two thousand (2,000) parts of boiling water. When cold, add six and nine-tenths (6.9) parts of sodium nitrite, stir till dissolved, and then while stirring allow the solution to flow into a mixture of forty-three (43) parts of hydrochloric acid (containing about thirty-seven per cent. HCl) and one hundred and fifty (150) parts of ice-cold water. As soon as the nitrous acid has practically disappeared allow the diazo solution to slowly flow into a solution of twenty-five (25) parts of nitro-meta-phenylene-diamin-sulfoacid in seven hundred and fifty (750) parts of water, to which an excess of sodium carbonate has been added and which has been heated to 50° centigrade. Stir during the whole of this operation. Continue the stirring and heat to a temperature of from 60° to 65° centigrade until combination is complete, which is the case when the solution has become clear and no more diazo compound can be detected. This takes place, as a rule, in from four to five hours. Salt the coloring-matter out, filter, press, &c.

My new coloring-matter is also obtained if thirty-one (31) parts of the ammonium salt of dehydrothiotoluidin sulfoacid be substituted for the primulin in the above example. When obtained in this way, it gives somewhat-greener shades on cotton.

My new coloring-matter is a brown-red powder soluble in cold water with an orange color. It dyes unmordanted cotton yellow shades which are especially characterized by their fastness to chlorin. For instance, when treated with a bleaching-powder solution of 1° Baumé for half an hour they remain practically unchanged. The addition of hydrochloric acid to the aqueous solution produces a yellowish-red precipitate, and concentrated caustic-soda lye produces a brownish-red to yellowish-red precipitate.

Now what I claim is—

1. The process for the production of yellow azo coloring-matters by diazotizing a specified thiazol body and combining the diazo compound obtained with nitro-meta-phenylene-diamin-sulfoacid.

2. As a new product the yellow azo coloring-matter which can be obtained by combining a diazotized thiazol body with a salt of nitro-meta-phenylene-diamin-sulfoacid, which is soluble in water, and dyes unmordanted cotton giving yellow shades which when treated with a bleaching-powder solution of 1° Baumé for half an hour remain practically unchanged, substantially as described.

In testimony whereof I have hereunto set my hand in the presence of two subscribing witnesses.

PAUL JULIUS.

Witnesses:
ERNEST G. EHRHARDT,
PERCY J. JONES.